(12) United States Patent
Barlaskar et al.

(10) Patent No.: US 12,184,594 B2
(45) Date of Patent: Dec. 31, 2024

(54) ENABLING POLLS IN AN END-TO-END ENCRYPTED MESSAGING PLATFORM

(71) Applicant: WhatsApp LLC, Menlo Park, CA (US)

(72) Inventors: Uzma Hussain Barlaskar, Berkeley, CA (US); George Nachman, Sunnyvale, CA (US); Attaullah Baig, Leander, TX (US)

(73) Assignee: WhatsApp LLC, Menlo Park, CA (US)

( * ) Notice: Subject to any disclaimer, the term of this patent is extended or adjusted under 35 U.S.C. 154(b) by 0 days.

(21) Appl. No.: 17/689,876

(22) Filed: Mar. 8, 2022

(65) Prior Publication Data

US 2023/0291698 A1    Sep. 14, 2023

(51) Int. Cl.
*H04L 51/046*    (2022.01)
*H04L 9/32*    (2006.01)

(52) U.S. Cl.
CPC .......... *H04L 51/046* (2013.01); *H04L 9/3247* (2013.01); *H04L 9/3263* (2013.01); *H04L 2209/463* (2013.01)

(58) Field of Classification Search
CPC ... H04L 51/046; H04L 51/52; H04L 63/0428; H04L 63/123; H04L 9/3247; H04L 9/3263; H04L 2209/463
See application file for complete search history.

(56) References Cited

U.S. PATENT DOCUMENTS

| | | | |
|---|---|---|---|
| 7,099,916 B1 * | 8/2006 | Hericourt | H04L 67/06 713/188 |
| 10,761,877 B2 * | 9/2020 | Peffers | G06F 9/466 |
| 11,658,955 B1 * | 5/2023 | Raj | H04L 63/108 713/168 |
| 2015/0161632 A1 | 6/2015 | Humay | |
| 2016/0071127 A1 * | 3/2016 | Li | G06Q 30/0203 705/7.32 |
| 2017/0308366 A1 * | 10/2017 | Huang | H04L 67/10 |
| 2018/0063094 A1 * | 3/2018 | Albrecht | H04L 9/0833 |
| 2021/0036850 A1 | 2/2021 | Sunkavally et al. | |
| 2021/0217106 A1 | 7/2021 | Hauser et al. | |
| 2022/0078194 A1 * | 3/2022 | Grover | H04L 9/14 |
| 2023/0024127 A1 * | 1/2023 | Moon | G06F 9/547 |
| 2023/0214792 A1 * | 7/2023 | Lee | G06Q 20/02 705/75 |

OTHER PUBLICATIONS

EPO—International Search Report and Written Opinion for International Application No. PCT/US2023/014790, mailed Jun. 21, 2023, 10 pages.

* cited by examiner

*Primary Examiner* — Jungwon Chang (74) *Attorney, Agent, or Firm* — McDermott Will & Emery LLP (57) ABSTRACT

Methods, systems, and storage media for generating polls in an end-to-end encrypted messaging platform are disclosed. Exemplary implementations may: initiate, by an initiator, a poll comprising a poll name, an ending time, and response choices; generate a message to a group of users regarding the poll; for each user of the group of users, generate a key pair comprising a chain key and a signature key; receive, from a user of the group of users, a selection comprising at least one of the response choices; and cause display of the selection through the poll.

18 Claims, 7 Drawing Sheets

ENABLING POLLS IN AN END-TO-END ENCRYPTED MESSAGING PLATFORM

TECHNICAL FIELD

The present disclosure generally relates to enabling polls in an end-to-end encrypted messaging platform and more particularly to generating polls in an end-to-end encrypted messaging platform.

BACKGROUND

Conventionally, people can communicate electronically via dedicated messaging platforms and social media platforms with electronic communication features. A growing trend is for these platforms to facilitate end-to-end encryption on electronic communications they handle. End-to-end encryption helps in protecting privacy and confidential information but can present challenges with respect to providing some user-facing features that are similar to popular ones provided by older, unencrypted messaging technologies.

BRIEF SUMMARY

The subject disclosure provides for systems and methods for enabling polls in an end-to-end encrypted messaging platform. A user is allowed to initiate a poll among a group of users of an end-to-end encrypted messaging platform. For example, some implementations allow individual users to propose a set of one or more questions with multiple choice answers in a group and allow all users in the group to vote on the answers.

One aspect of the present disclosure relates to a method for generating polls in an end-to-end encrypted messaging platform. The method may include initiating, by an initiator, a poll including a poll name, an ending time, and response choices. The method may include generating a message to a group of users regarding the poll. The message may be generated through sender encryption keys. The method may include, for each user of the group of users, generating a key pair including a chain key and a signature key. The signature key may include a public key and a private key for each user. The method may include receiving, from a user of the group of users, a selection including at least one of the response choices. The selection may further include the private key of the user. The method may include causing display of the selection through the poll.

Another aspect of the present disclosure relates to a system configured for generating polls in an end-to-end encrypted messaging platform. The system may include one or more hardware processors configured by machine-readable instructions. The processor(s) may be configured to initiate, by an initiator, a poll including a poll name, an ending time, and response choices. The initiator may include a user of a group of users. The response choices, the ending time, and the poll name may be determined by the initiator. The poll may include a set of one or more questions with multiple choice answers. The processor(s) may be configured to generate a message to a group of users regarding the poll. The message may be generated through sender encryption keys. The processor(s) may be configured to, for each user of the group of users, generate a key pair including a chain key and a signature key. The signature key may include a public key and a private key for each user. The processor(s) may be configured to receive, from a user of the group of users, a selection including at least one of the response choices. The selection may further include the private key of the user. The processor(s) may be configured to cause display of the selection through the poll.

Yet another aspect of the present disclosure relates to a non-transient computer-readable storage medium having instructions embodied thereon, the instructions being executable by one or more processors to perform a method for generating polls in an end-to-end encrypted messaging platform. The method may include initiating, by an initiator, a poll including a poll name, an ending time, and response choices. The initiator may include a user of a group of users. The response choices, the ending time, and the poll name may be determined by the initiator. The poll may include a set of one or more questions with multiple choice answers. The method may include generating a message to a group of users regarding the poll. The message may be generated through sender encryption keys. The method may include, for each user of the group of users, generating a key pair including a chain key and a signature key. The signature key may include a public key and a private key for each user. The method may include receiving, from a user of the group of users, a selection including at least one of the response choices. The possible responses may include one or more of true or false, yes or no, agree or disagree, a rating within a range of quantities, multiple choice, or two or more narrative answers. The selection may further include the private key of the user. The public keys for each user may remain valid for post validation checks after the ending time of the poll. The method may include causing display of the selection through the poll. Display of the selection through the poll may be restricted to user devices of the users of the group of users.

Still another aspect of the present disclosure relates to a system configured for generating polls in an end-to-end encrypted messaging platform. The system may include means for initiating, by an initiator, a poll including a poll name, an ending time, and response choices. The system may include means for generating a message to a group of users regarding the poll. The message may be generated through sender encryption keys. The system may include means for, for each user of the group of users, generating a key pair including a chain key and a signature key. The signature key may include a public key and a private key for each user. The system may include means for receiving, from a user of the group of users, a selection including at least one of the response choices. The selection may further include the private key of the user. The system may include means for causing display of the selection through the poll.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Polling features in conventional (e.g., not end-to-end encrypted) technologies are a popular way for groups of users to take votes on various topics. Unlike conventional technologies, however, end-to-end encrypted messaging platforms typically do not involve a central server that can read messages (e.g., votes in a poll) to tally up the winner. As such, existing end-to-end technologies lack an ability to facilitate polls among users.

The subject disclosure provides for systems and methods for enabling polls in an end-to-end encrypted messaging platform. A user is allowed to initiate a poll among a group of users of an end-to-end encrypted messaging platform. For example, some implementations allow individual users to propose a set of one or more questions with multiple choice answers in a group and allow all users in the group to vote on the answers.

Implementations described herein address the aforementioned shortcomings and other shortcomings by providing one or more sources of truth among users (e.g., for polling) compatible with end-to-end encrypted messaging platforms. For example, some implementations allow individual users to propose a set of one or more questions with multiple choice answers in a group and allow all users in the group to vote on the answers. In some implementations, the poll may have a preset end time. Such a poll may be facilitated in an end-to-end encrypted messaging system through features including initiating a poll with response choices, generating a message regarding the poll to a group of users through sender encryption keys, and, for each user of the group of users, generating a key pair comprising a chain key and a signature key. An individual user's selection of the response choices may be received with the private key of the user.

Figure 1:
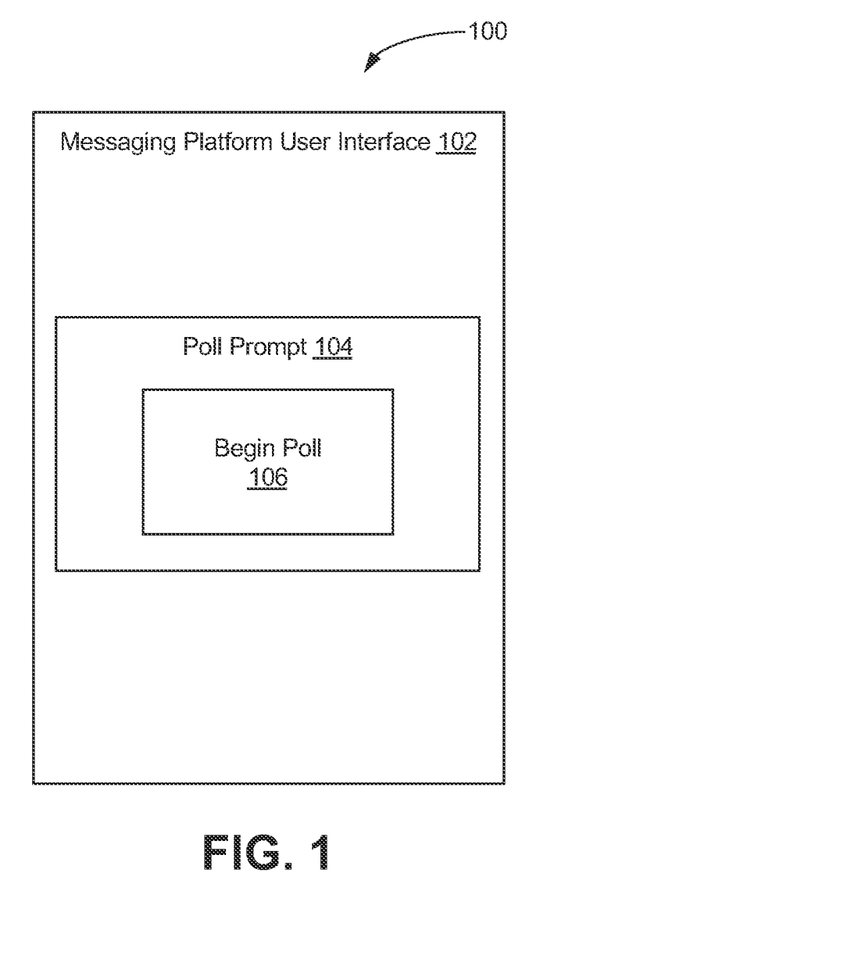
FIGS. 1-3 illustrate example views of a poll provided in an end-to-end encrypted messaging platform, in accordance with one or more implementations.
Figure 2:
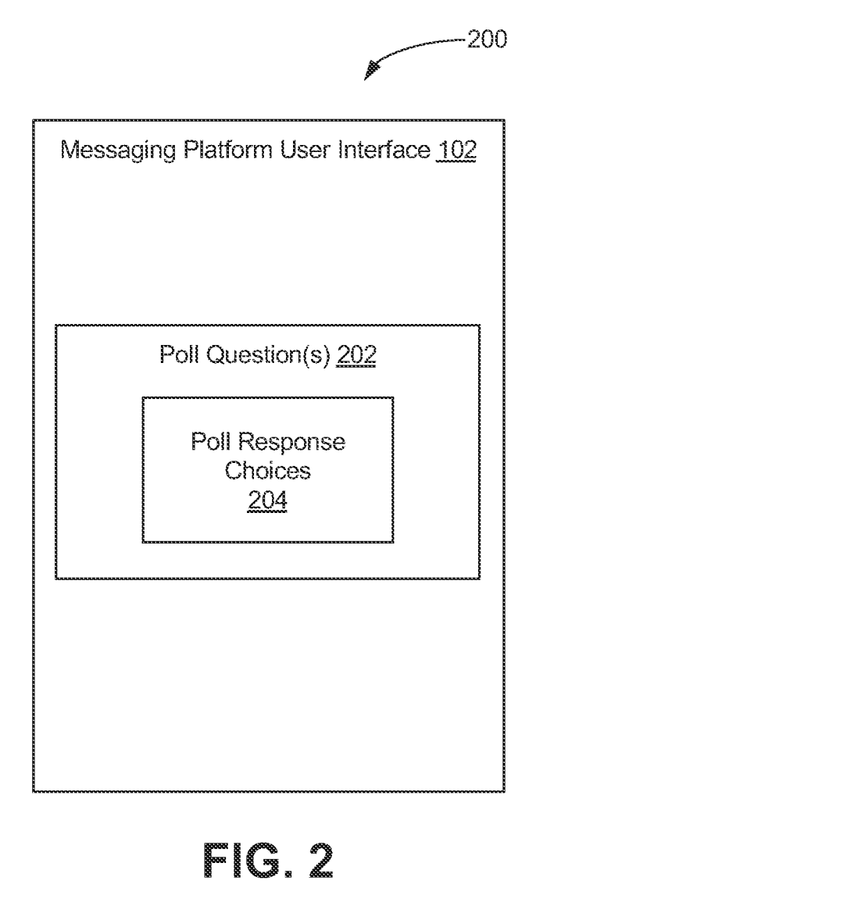
Figure 3:
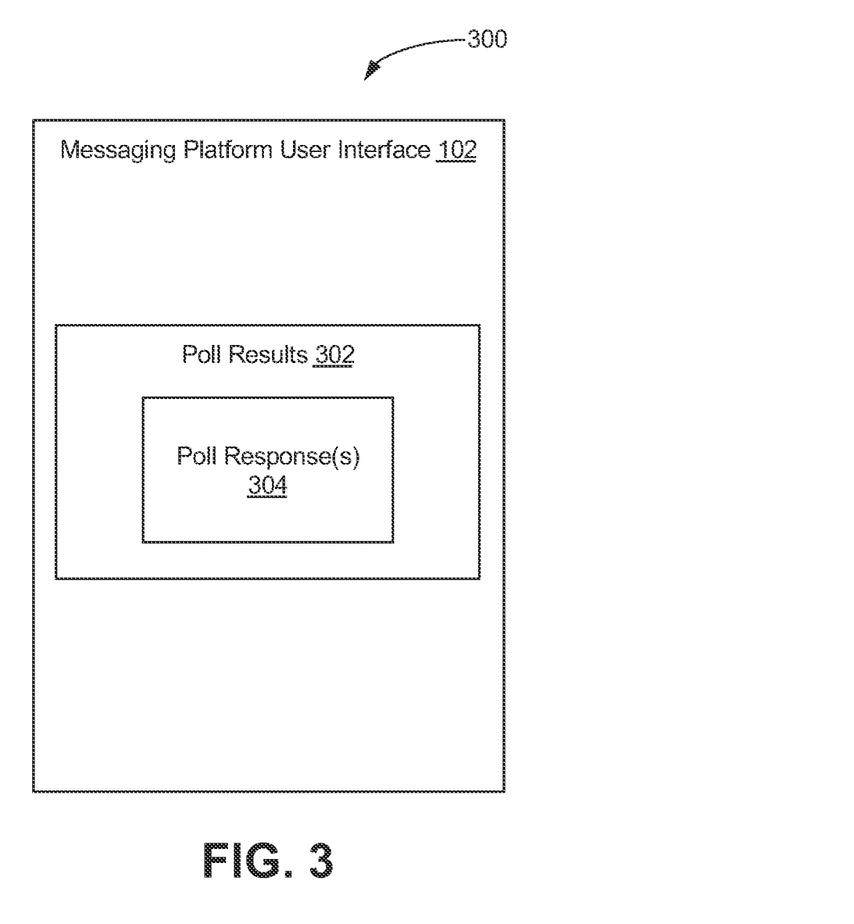

FIGS. 1-3 illustrate example views of a poll provided in an end-to-end encrypted messaging platform, in accordance with one or more implementations. To illustrate exemplary implementations, a group of users may include User A, User B, User C, User D, and/or other users. Although anyone in the group can start a poll, in this example User A is the poll initiator for a poll on the type of cuisine (e.g., Italian, Mexican, or Indian) for a dinner the users are all planning together. The poll initiator may name the poll (e.g., "Dinner Choice"). The poll initiator may set an end time to the poll (e.g., 5:00 PM PT on Dec. 15, 2021). The poll initiator may provide one or more poll questions (e.g., "Where should we eat tonight?"). The poll initiator may provide response choices for each question (e.g., Italian, Mexican, or Indian cuisine). The poll initiator (i.e., User A) may send a poll start message (e.g., a prompt) to all users in the group (or a subset of users in the group). The poll initiator may send the message using the sender encryption keys established for communicating within that group. In the view 100 in FIG. 1, a messaging platform user interface (UI) 102 includes a poll prompt 104 with a begin poll 106 button, which the other users may see on their respective devices and may use to begin the poll. Once the begin poll 106 button is clicked, the users may be presented with one or more poll questions and response choices. The view 200 in FIG. 2 illustrates the messaging platform UI 102 with poll question(s) 202 and poll response choices 204. Once the poll is closed (e.g., at a specified ending time), the results may be presented to the users via their respective devices. In the view 300 of FIG. 3, the messaging platform UI 102 includes poll results 302 and poll responses 304.

According to some implementations, encryption keys may be used to ensure accurate counting of poll responses. Once the poll has started, all poll participants including User A may generate a 32-byte random Chain Key (CK) and a new curve25519 Signature Key (SK) pair for the "Dinner Choice" poll. These keys may facilitate poll visibility to be limited to the group members. These keys may allow the poll initiator to optionally select a subset of group members to participate in the poll. The users may encrypt the CK and Public Key from the SK and send to all poll participants using the pairwise encrypted sessions. These keys may be used for poll responses. For example, User B may generate a Message Key (MK) for each poll response from the CK and sign the poll response with the SK. User B may delete the MK and update the CK with a hash ratchet. The poll participant CK's and SK's may expire at the end of the poll. All private/secret keys may be deleted at the end of the poll. The public keys can remain valid for post validation checks.

Figure 4:
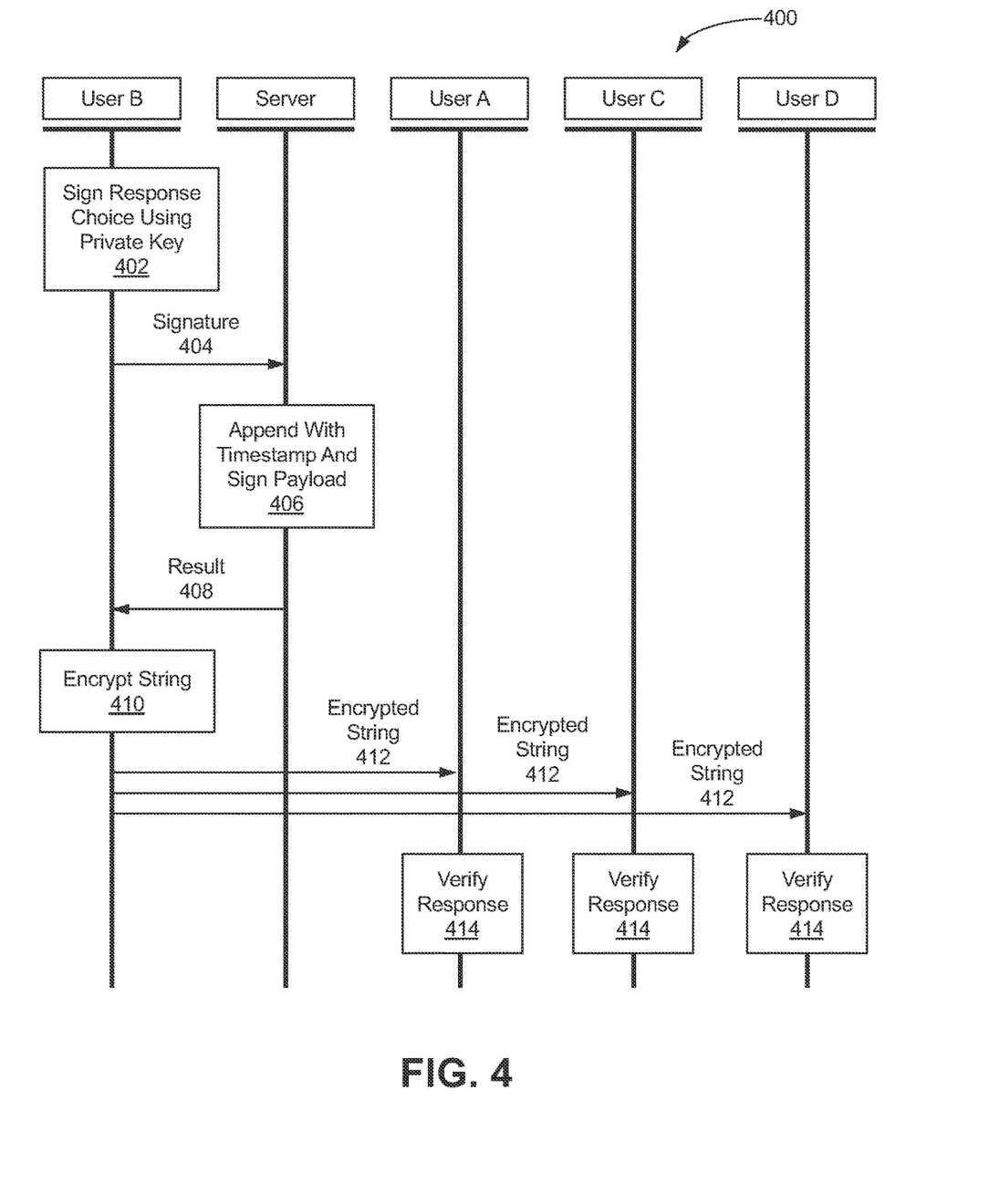
FIG. 4 illustrates an example flow diagram for facilitating a poll in an end-to-end encrypted messaging platform, in accordance with one or more implementations.

FIG. 4 illustrates an example flow diagram (e.g., process 400) for facilitating a poll in an end-to-end encrypted messaging platform, in accordance with one or more implementations. More specifically, the flow diagram of FIG. 4 shows how a user may respond after a poll has been initiated. For example, User B may click on the "Dinner Choice" poll (e.g., via the poll prompt 104 in FIG. 1) and be presented with the question and response choices (e.g., via the poll question(s) 202 and poll response choices 204 in FIG. 2). User B may select a response (e.g., Mexican cuisine).

At step 402, after User B has selected a response, User B's client may sign the string "Dinner Choice: Mexican" with her private key from SK. User B's signed poll response (SPR) may include sign("Dinner Choice: Mexican", User B's private SK). At step 404, User B's client sends signature to a server. The server may be the messaging server or an alternate signing server owned by a third party. The server cannot see the raw text, it is just a signature and the server does not verify this signature. To the server the signature is just a unit data. At step 406, the server may append the received signature using a server timestamp (TS) and may sign the entire payload with a server timestamp signing key (STSK). In some implementations, the server signature of User B's signed poll response may include sign((User B's signed poll response+TS), STSK)+TS. At step 408, the server may send the result of step 406 (which includes the TS in clear) to User B. This may be referred to as a server attestation of User B's poll response (SA). At step 410, User B may encrypt the string ("Dinner Choice: Mexican"+User B's signed poll response (SPR)+SA+hash(original poll start message from User A)). In some implementations, User B's client may store the encrypted string until all participants have received the poll response or five minutes after the poll ends whichever comes earlier. At step 412, User B may send the encrypted string to all poll participants. In some implementations, User B may additionally sign the entire string with his SK. The hash of the original poll start message from User A may be needed to prevent User A from sending different options to different people and essentially forcing a specific outcome. For example, User A may include the choice of Italian or Mexican to half the group participants, if she doesn't like Indian as an outcome of the poll. The server may fan out the response to all participants and, if needed, retry delivery. User B may receive a delivery notification and/or read receipt. If User B's client sees that not all participants have received his poll response, User B's client may retry delivery one more time after the poll ends and within five minutes of poll ending. At step 414, all participants that have received a User B's response can verify that the poll response came from User B and it was received by the server before the poll ended.

According to some implementations, in a situation where five users join a group, a poll starts, and one user leaves group, the poll view for all active polls may get refreshed every time a user connects to the end-to-end encrypted messaging platform or upon group membership changes. As part of the poll view refresh, all responses may be validated by a client application and may be matched against current group participation. The vote for the user who left the group may be dropped as part of this process and poll initiator may optionally sign the overall result envelope.

According to some implementations, in a situation where five users join a group, a poll starts, and one user is added to the group, any new user that joins the group after the poll starts may not see any poll content of previous polls.

According to some implementations, in a situation where five users join a group, a poll starts, and one user is not online, an existing group member may be able to participate in the poll if he/she votes before the poll ends. An existing user of the group may see all poll content and responses when he/she comes online.

According to some implementations, in a situation where five users join a group, a poll starts, one user is not connected to the end-to-end encrypted messaging platform but then reconnects, and another user disconnects from the end-to-end encrypted messaging platform, the same principles as above.

In some implementations, users may be allowed to change their votes as long as the server receives the message before the poll end time. Poll participants may maintain a timestamp of User B's previous votes. If User B changes her vote and the server timestamp is before the poll end time, then the users will update User B's vote.

The disclosed system(s) address a problem in traditional techniques tied to computer technology for polls in an end-to-end encrypted messaging platform, namely, the technical problem of counting poll responses in the absence of a central server that can read messages between users. The disclosed system solves this technical problem by providing a solution also rooted in computer technology, namely, by providing for generating polls in an end-to-end encrypted messaging platform. The disclosed subject technology further provides improvements to the functioning of the computer itself because it improves processing and efficiency in enabling polls in an end-to-end encrypted messaging platform.

Figure 5:
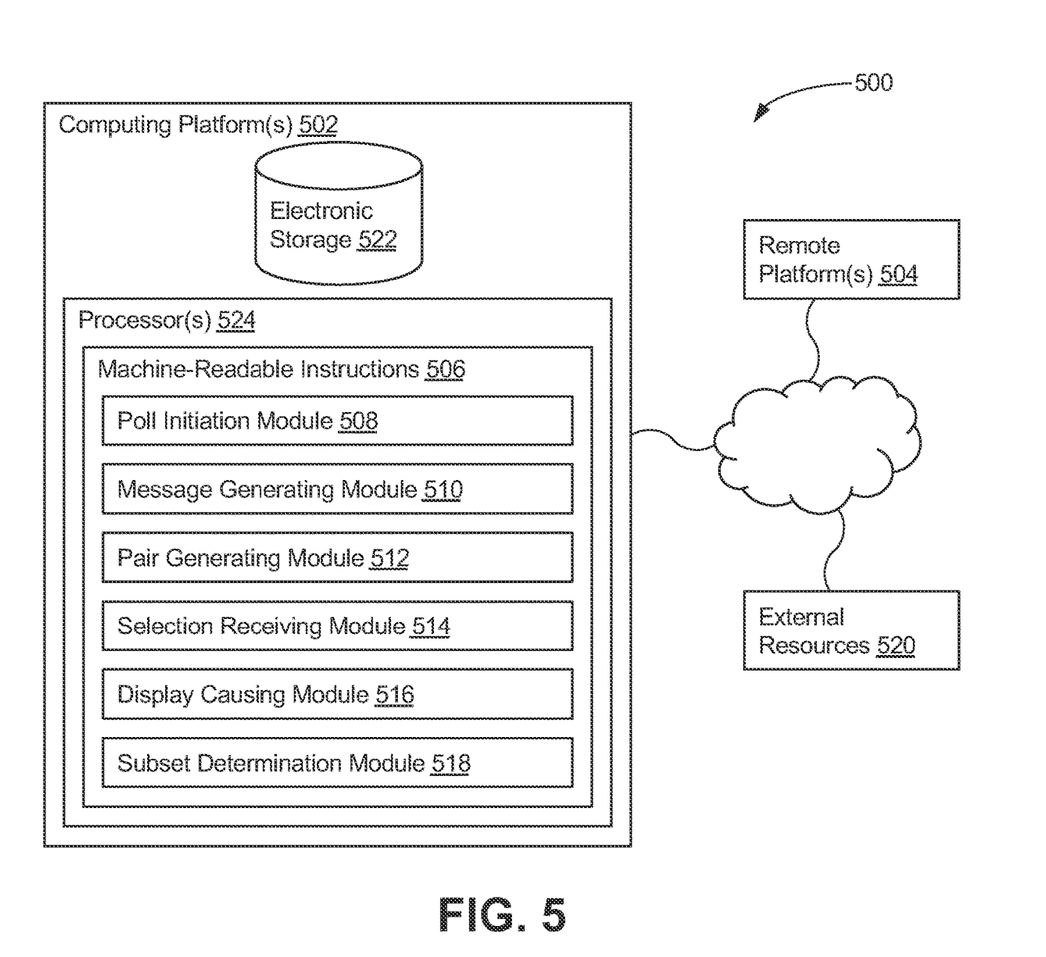
FIG. 5 illustrates a system configured for enabling polls in an end-to-end encrypted messaging platform, in accordance with one or more implementations.

FIG. 5 illustrates a system 500 configured for enabling polls in an end-to-end encrypted messaging platform, according to certain aspects of the disclosure. In some implementations, system 500 may include one or more computing platforms 502. Computing platform(s) 502 may be configured to communicate with one or more remote platforms 504 according to a client/server architecture, a peer-to-peer architecture, and/or other architectures. Remote platform(s) 504 may be configured to communicate with other remote platforms via computing platform(s) 502 and/or according to a client/server architecture, a peer-to-peer architecture, and/or other architectures. Users may access system 500 via remote platform(s) 504.

Computing platform(s) 502 may be configured by machine-readable instructions 506. Machine-readable instructions 506 may include one or more instruction modules. The instruction modules may include computer program modules. The instruction modules may include one or more of poll initiation module 508, message generating module 510, pair generating module 512, selection receiving module 514, display causing module 516, subset determination module 518, and/or other instruction modules.

Poll initiation module 508 may be configured to initiate, by an initiator, a poll including a poll name, an ending time, and response choices. The poll may include a set of one or more questions with multiple choice answers. The poll may be generated through the end-to-end encrypted messaging platform. Communications within the group may occur through the end-to-end encrypted messaging platform. The initiator may include a user of a group of users. The initiator may be separate from the group of users. The initiator may be an automated feature of the end-to-end encrypted messaging platform. By way of non-limiting example, the response choices, the ending time, and the poll name may be determined by the initiator. By way of non-limiting example, the poll name may include one or more of a default name, a predetermined name, an autogenerated name, and/or a user-provided name. The ending time may include a time after which no new response choices are counted as part of the poll.

Message generating module 510 may be configured to generate a message to a group of users regarding the poll. Generating the message through the sender encryption keys may include using the sender encryptions keys to encrypt the message. The message may be generated through sender encryption keys. The sender encryption keys may be utilized for communicating within the group. The sender encryption keys may include a sender public key and a sender private key.

Pair generating module 512 may be configured to, for each user of the group of users, generate a key pair including a chain key and a signature key. For example, the key pair may include a 32-byte random chain key and a new curve25519 signature key. The chain key and the signature key may expire at the ending time of the poll. Generating the key pair for a given user may include using output of a random bit generator configured to generate sequences of unpredictable and unbiased bits. Generating the key pair for a given user may include indirectly creating the key pair during a key agreement transaction from another key or from a password. The chain key may be generated and assigned to a brief interval of time instead of to individuals or organizations. The chain key may include blocks of cryptographic data chained through time.

The signature key may include a public key and a private key for each user. In some implementations, a public key of a given user can be used by any other user to encrypt a message or poll response intended for the given user. In some implementations, the encrypted message or poll response can only be decrypted with a private key of the given user. According to aspects, a signature key of a given user facilitates using the private key to write signatures to the given user's poll responses. According to aspects, a signature key of a given user facilitates using the public key to allow other users to check whether the poll responses belong to the given user.

Selection receiving module 514 may be configured to receive, from a user of the group of users, a selection including at least one of the response choices. The selection may further include the private key of the user. In some implementations, a given response choice may include at least one of two or more possible responses to a corresponding question. In some implementations, by way of non-limiting example, the possible responses may include one or more of true or false, yes or no, agree or disagree, a rating within a range of quantities, multiple choice, or two or more narrative answers. All private/secret keys may be deleted at the ending time of the poll. In some implementations, the public keys for each user may remain valid for post validation checks after the ending time of the poll. A post validation check of a given poll may include using the public keys of users who responded to the poll to check whether the poll responses belong to individual ones of the users at one or more times after the ending time of the poll.

Display causing module 516 may be configured to cause display of the selection through the poll. Display of the selection through the poll can be caused via user devices of the users of the group of users. Display of the selection through the poll can only be caused via user devices of the users of the group of users. Display of the selection through the poll may be restricted to user devices of the users of the group of users.

Subset determination module 518 may be configured to determine a subset of users from the group of users to participate in the poll.

In some implementations, computing platform(s) 502, remote platform(s) 504, and/or external resources 520 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 502, remote platform(s) 504, and/or external resources 520 may be operatively linked via some other communication media.

A given remote platform 504 may include one or more processors configured to execute computer program modules. The computer program modules may be configured to enable an expert or user associated with the given remote platform 504 to interface with system 500 and/or external resources 520, and/or provide other functionality attributed herein to remote platform(s) 504. By way of non-limiting example, a given remote platform 504 and/or a given computing platform 502 may include one or more of a server, a desktop computer, a laptop computer, a handheld computer, a tablet computing platform, a NetBook, a Smartphone, a gaming console, and/or other computing platforms.

External resources 520 may include sources of information outside of system 500, external entities participating with system 500, and/or other resources. In some implementations, some or all of the functionality attributed herein to external resources 520 may be provided by resources included in system 500.

Computing platform(s) 502 may include electronic storage 522, one or more processors 524, and/or other components. Computing platform(s) 502 may include communication lines, or ports to enable the exchange of information with a network and/or other computing platforms. Illustration of computing platform(s) 502 in FIG. 5 is not intended to be limiting. Computing platform(s) 502 may include a plurality of hardware, software, and/or firmware components operating together to provide the functionality attributed herein to computing platform(s) 502. For example, computing platform(s) 502 may be implemented by a cloud of computing platforms operating together as computing platform(s) 502.

Electronic storage 522 may comprise non-transitory storage media that electronically stores information. The electronic storage media of electronic storage 522 may include one or both of system storage that is provided integrally (i.e., substantially non-removable) with computing platform(s) 502 and/or removable storage that is removably connectable to computing platform(s) 502 via, for example, a port (e.g., a USB port, a firewire port, etc.) or a drive (e.g., a disk drive, etc.). Electronic storage 522 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 522 may include one or more virtual storage resources (e.g., cloud storage, a virtual private network, and/or other virtual storage resources). Electronic storage 522 may store software algorithms, information determined by processor(s) 524, information received from computing platform(s) 502, information received from remote platform(s) 504, and/or other information that enables computing platform(s) 502 to function as described herein.

Processor(s) 524 may be configured to provide information processing capabilities in computing platform(s) 502. As such, processor(s) 524 may include one or more of a digital processor, an analog processor, a digital circuit designed to process information, an analog circuit designed to process information, a state machine, and/or other mechanisms for electronically processing information. Although processor(s) 524 is shown in FIG. 5 as a single entity, this is for illustrative purposes only. In some implementations, processor(s) 524 may include a plurality of processing units. These processing units may be physically located within the same device, or processor(s) 524 may represent processing functionality of a plurality of devices operating in coordination. Processor(s) 524 may be configured to execute modules 508, 510, 512, 514, 516, and/or 518, and/or other modules. Processor(s) 524 may be configured to execute modules 508, 510, 512, 514, 516, and/or 518, and/or other modules by software; hardware; firmware; some combination of software, hardware, and/or firmware; and/or other mechanisms for configuring processing capabilities on processor(s) 524. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 508, 510, 512, 514, 516, and/or 518 are illustrated in FIG. 5 as being implemented within a single processing unit, in implementations in which processor(s) 524 includes multiple processing units, one or more of modules 508, 510, 512, 514, 516, and/or 518 may be implemented remotely from the other modules. The description of the functionality provided by the different modules 508, 510, 512, 514, 516, and/or 518 described below is for illustrative purposes, and is not intended to be limiting, as any of modules 508, 510, 512, 514, 516, and/or 518 may provide more or less functionality than is described. For example, one or more of modules 508, 510, 512, 514, 516, and/or 518 may be eliminated, and some or all of its functionality may be provided by other ones of modules 508, 510, 512, 514, 516, and/or 518. As another example, processor(s) 524 may be configured to execute one or more additional modules that may perform some or all of the functionality attributed below to one of modules 508, 510, 512, 514, 516, and/or 518.

In particular embodiments, one or more objects (e.g., content or other types of objects) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular embodiments, privacy settings may be based on one or more nodes or edges of a social graph. A privacy setting may be specified for one or more edges or edge-types of the social graph, or with respect to one or more nodes, or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system. The object may be associated with a concept node connected to a user node of the first user by an edge. The first user may specify privacy settings that apply to a particular edge connecting to the concept node of the object, or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers may be authorization/privacy servers for enforcing privacy settings. In response to a request from a user (or other entity) for a particular object stored in a data store, the social-networking system may send a request to the data store for the object. The request may identify the user associated with the request and the object may be sent only to the user (or a client system of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system may access such information in order to provide a particular function or service to the first user, without the social-networking system having access to that information for any other purposes. Before accessing, storing, or using such objects or information, the social-networking system may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system.

In particular embodiments, a user may specify whether particular types of objects or information associated with the first user may be accessed, stored, or used by the social-networking system. As an example and not by way of limitation, the first user may specify that images sent by the first user through the social-networking system may not be stored by the social-networking system. As another example and not by way of limitation, a first user may specify that messages sent from the first user to a particular second user may not be stored by the social-networking system. As yet another example and not by way of limitation, a first user may specify that all objects sent via a particular application may be saved by the social-networking system.

In particular embodiments, privacy settings may allow a first user to specify whether particular objects or information associated with the first user may be accessed from particular client systems or third-party systems. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system may provide default privacy settings with respect to each device, system, or application, and/or the first user may be prompted to specify a particular privacy setting for each context. As an example and not by way of limitation, the first user may utilize a location-services feature of the social-networking system to provide recommendations for restaurants or other places in proximity to the user. The first user's default privacy settings may specify that the social-networking system may use location information provided from a client device of the first user to provide the location-based services, but that the social-networking system may not store the location information of the first user or provide it to any third-party system. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system may send a reminder to the user to confirm his or her privacy settings every six months or after every ten photo posts. In particular embodiments, privacy settings may also allow users to control access to the objects or information on a per-request basis. As an example and not by way of limitation, the social-networking system may notify the user whenever a third-party system attempts to access information associated with the user, and require the user to provide verification that access should be allowed before proceeding.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 6:
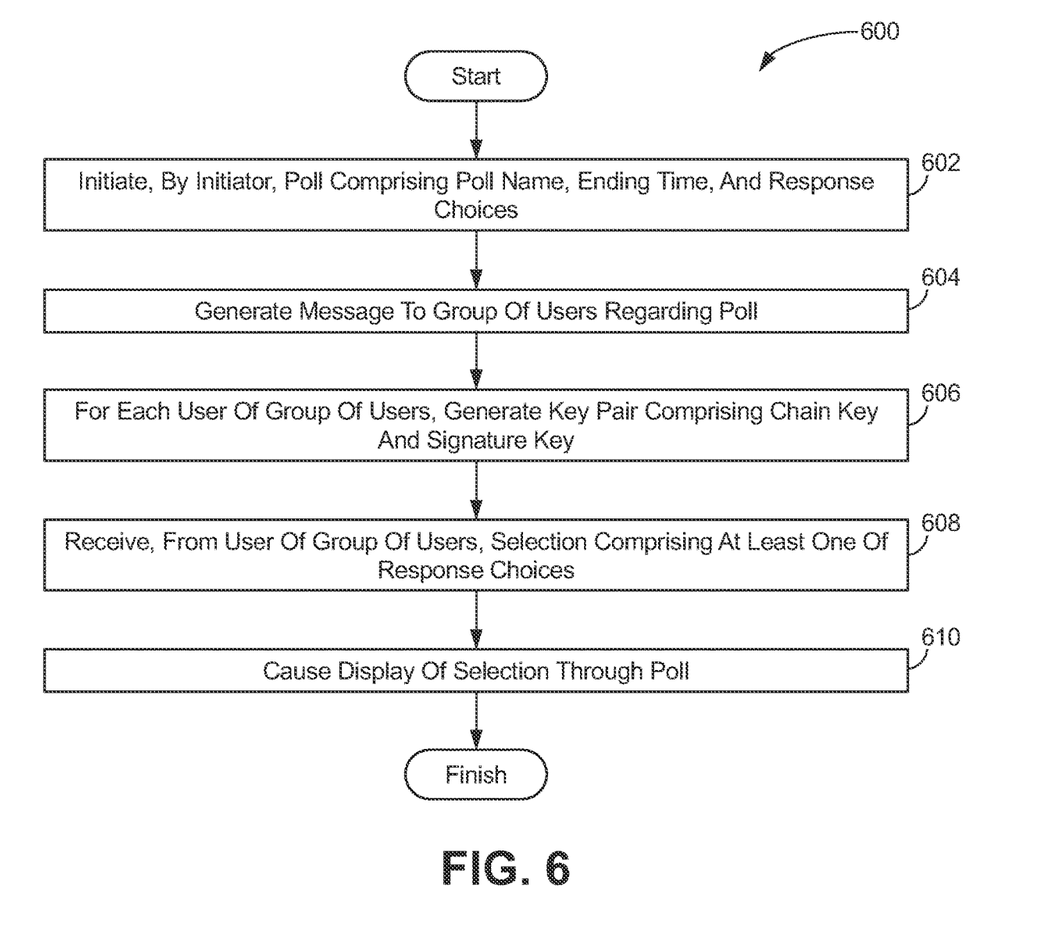
FIG. 6 illustrates an example flow diagram for enabling polls in an end-to-end encrypted messaging platform, according to certain aspects of the disclosure.

FIG. 6 illustrates an example flow diagram (e.g., process 600) for enabling polls in an end-to-end encrypted messaging platform, according to certain aspects of the disclosure. For explanatory purposes, the example process 600 is described herein with reference to FIGS. 1-5. Further for explanatory purposes, the steps of the example process 600 are described herein as occurring in serial, or linearly.

However, multiple instances of the example process 600 may occur in parallel. For purposes of explanation of the subject technology, the process 600 will be discussed in reference to FIGS. 1-5.

At step 602, the process 600 may include initiating, by an initiator, a poll including a poll name, an ending time, and response choices. At step 604, the process 600 may include generating a message to a group of users regarding the poll. The message may be generated through sender encryption keys. At step 606, the process 600 may include for each user of the group of users, generating a key pair including a chain key and a signature key. The signature key may include a public key and a private key for each user. At step 608, the process 600 may include receiving, from a user of the group of users, a selection including at least one of the response choices. The selection may further include the private key of the user. At step 610, the process 600 may include causing display of the selection through the poll.

For example, as described above in relation to FIGS. 1-5, at step 602, the process 600 may include initiating, by an initiator, a poll including a poll name, an ending time, and response choices, through poll initiation module 508. At step 604, the process 600 may include generating a message to a group of users regarding the poll, through message generating module 510. The message may be generated through sender encryption keys. At step 606, the process 600 may include for each user of the group of users, generating a key pair including a chain key and a signature key, through pair generating module 512. The signature key may include a public key and a private key for each user. At step 608, the process 600 may include receiving, from a user of the group of users, a selection including at least one of the response choices, through selection receiving module 514. The selection may further include the private key of the user. At step 610, the process 600 may include causing display of the selection through the poll, through display causing module 516.

According to an aspect, the initiator comprises a user of a group of users.

According to an aspect, the response choices, the ending time, and the poll name are determined by the initiator.

According to an aspect, the poll comprises a set of one or more questions with multiple choice answers.

According to an aspect, the sender encryption keys are utilized for communicating within the group.

According to an aspect, the key pair comprises a 32-byte random chain key (CK) and a new curve25519 signature key (SK).

According to an aspect, the process 600 further includes determining a subset of users from the group of users to participate in the poll.

According to an aspect, the chain key and the signature key expire at the ending time of the poll.

According to an aspect, all private/secret keys are deleted at the ending time of the poll.

According to an aspect, the public keys for each user remain valid for post validation checks after the ending time of the poll.

According to an aspect, the poll is generated through the end-to-end encrypted messaging platform.

Figure 7:
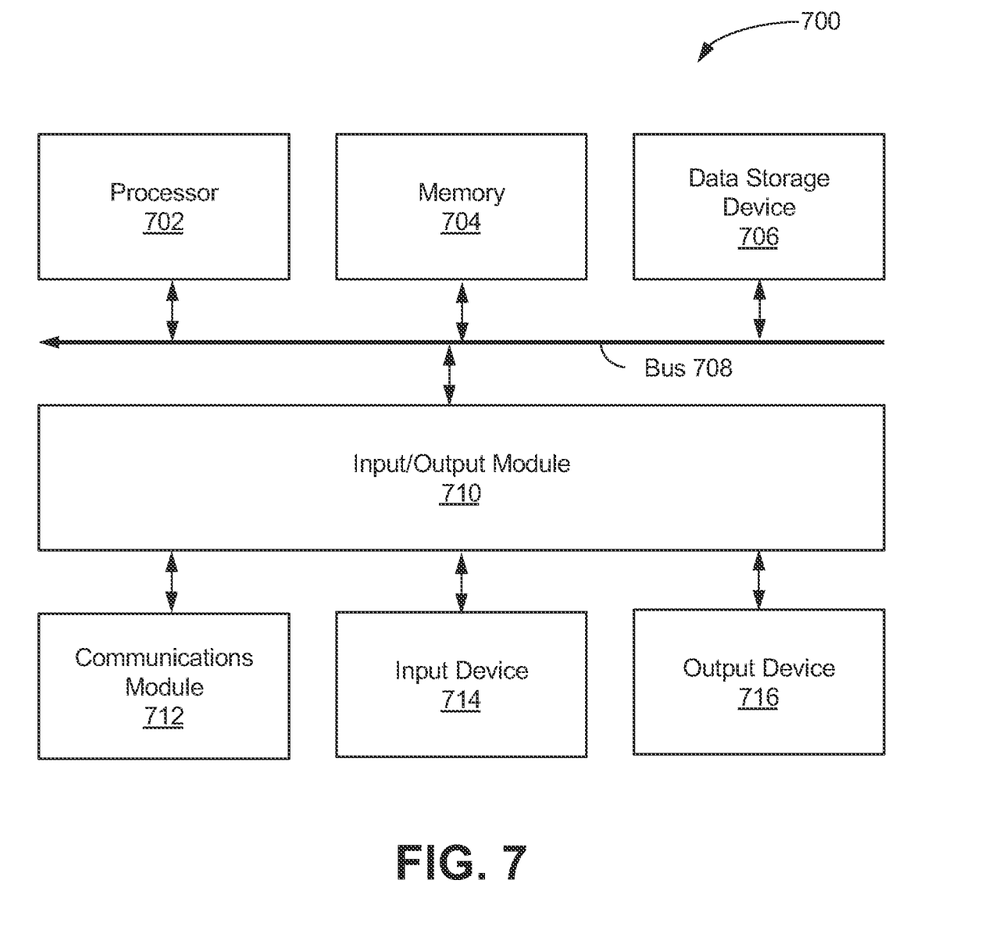
FIG. 7 is a block diagram illustrating an example computer system (e.g., representing both client and server) with which aspects of the subject technology can be implemented.

FIG. 7 is a block diagram illustrating an exemplary computer system 700 with which aspects of the subject technology can be implemented. In certain aspects, the computer system 700 may be implemented using hardware or a combination of software and hardware, either in a dedicated server, integrated into another entity, or distributed across multiple entities.

Computer system 700 (e.g., server and/or client) includes a bus 708 or other communication mechanism for communicating information, and a processor 702 coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer-readable medium for execution by, or to control the operation of, the computer system 700, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, the input/output module 710 is configured to connect to a plurality of devices, such as an input device 714 and/or an output device 716. Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 716 include display devices such as an LCD (liquid crystal display) monitor, for displaying information to the user.

According to one aspect of the present disclosure, the above-described gaming systems can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in the main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 700 reads game data and provides a game, information may be read from the game data and stored in a memory device, such as the memory 704. Additionally, data from the memory 704 servers accessed via a network the bus 708, or the data storage 706 may be read and loaded into the memory 704. Although data is described as being found in the memory 704, it will be understood that data does not have to be stored in the memory 704 and may be stored in other memory accessible to the processor 702 or distributed among several media, such as the data storage 706.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for generating polls in an end-to-end encrypted messaging platform, comprising:
   initiating, by an initiator, a poll comprising a poll name, an ending time, a plurality of response choices, and a selection, by the initiator, of users from a plurality of users in a group to participate in the poll;
   generating a message to the selected users regarding the poll, the message being generated through sender encryption keys;
   for each selected user, generating a key pair comprising a chain key and a signature key, the signature key comprising a public key and a private key for each selected user, the chain key being generated and assigned to an interval of time, the chain key comprising blocks of cryptographic data chained through time;
   receiving, from a particular user of the selected users, a selection comprising at least one of the response choices, the selection further comprising a private key of the particular user; and
   causing display of the selection through the poll,
   wherein the chain key is used to limit poll visibility to the selected users in the group, and
   wherein a signature key of the particular user facilitates using the private key of the particular user to write signatures to the poll responses of the particular user.

2. The method of claim 1, wherein the initiator comprises a user from the plurality of users.

3. The method of claim 1, wherein the plurality of response choices, the ending time, and the poll name are determined by the initiator.

4. The method of claim 1, wherein the poll comprises a set of one or more questions with multiple choice answers.

5. The method of claim 1, wherein the sender encryption keys are utilized for communicating within the group.

6. The method of claim 1, wherein the key pair comprises a 32-byte random chain key and a new curve25519 signature key.

7. The method of claim 1, wherein the chain key and the signature key expire at the ending time of the poll.

8. The method of claim 1, wherein all chain keys and private keys from the signature keys for each selected user are deleted at the ending time of the poll.

9. The method of claim 8, wherein the public keys from the signature keys for each selected user remain valid for post validation checks after the ending time of the poll.

10. A system configured for generating polls in an end-to-end encrypted messaging platform, the system comprising:
    one or more hardware processors configured by machine-readable instructions to:
    initiate, by an initiator, a poll comprising a poll name, an ending time, a plurality of response choices, and a selection, by the initiator, of users from a plurality of users in a group to participate in the poll, wherein the initiator comprises a user from the plurality of users, wherein the response choices, the ending time, and the poll name are determined by the initiator, and wherein the poll comprises a set of one or more questions with multiple choice answers;
    generate a message to the selected users regarding the poll, the message being generated through sender encryption keys;
    for each selected user, generate a key pair comprising a chain key and a signature key, the signature key comprising a public key and a private key for each selected user, the chain key being generated and assigned to an interval of time, the chain key comprising blocks of cryptographic data chained through time;
    receive, from a particular user of the selected users, a selection comprising at least one of the response choices, the selection further comprising a private key of the particular user; and
    cause display of the selection through the poll,
    wherein the chain key is used to limit poll visibility to the selected users in the group.

11. The system of claim 10, wherein the plurality of response choices comprise one or more of true or false, yes or no, agree or disagree, a rating within a range of quantities, multiple choice, or two or more narrative answers.

12. The system of claim 10, wherein a signature key of the particular user facilitates using the private key of the particular user to write signatures to the poll responses of the particular user.

13. The system of claim 10, wherein a signature key of the particular user facilitates using the public key of the particular user to allow other users to check whether the poll responses belong to the particular user.

14. The system of claim 10, wherein the sender encryption keys are utilized for communicating within the group.

15. The system of claim 10, wherein the key pair comprises a 32-byte random chain key and a new curve25519 signature key.

16. The system of claim 10, wherein the chain key and the signature key expire at the ending time of the poll.

17. The system of claim 10, wherein all chain keys and private keys from the signature keys for each selected user are deleted at the ending time of the poll, and wherein the public keys from the signature keys for each selected user remain valid for post validation checks after the ending time of the poll.

18. A non-transient computer-readable storage medium having instructions embodied thereon, the instructions being executable by one or more processors to perform a method for generating polls in an end-to-end encrypted messaging platform, the method comprising:

initiating, by an initiator, a poll comprising a poll name, an ending time, a plurality of response choices, and a selection, by the initiator, of users from a plurality of users in a group to participate in the poll, wherein the initiator comprises a user from the plurality of users, wherein the response choices, the ending time, and the poll name are determined by the initiator, and wherein the poll comprises a set of one or more questions with multiple choice answers;

generating a message to the selected users regarding the poll, the message being generated through sender encryption keys;

for each selected user, generating a key pair comprising a chain key and a signature key, the signature key comprising a public key and a private key for each selected user, the chain key being generated and assigned to an interval of time, the chain key comprising blocks of cryptographic data chained through time;

receiving, from a particular user of the selected users, a selection comprising at least one of the response choices, wherein possible responses include one or more of true or false, yes or no, agree or disagree, a rating within a range of quantities, multiple choice, or two or more narrative answers, wherein the selection further comprises a private key of the particular user, and wherein the public keys for each user remain valid for post validation checks after the ending time of the poll; and causing display of the selection through the poll, wherein display of the selection through the poll is restricted to user devices of the selected users of the group of users.

* * * * *